US009081120B2

(12) United States Patent
Olivier

(10) Patent No.: US 9,081,120 B2
(45) Date of Patent: Jul. 14, 2015

(54) APPARATUS AND METHOD FOR LOW-TENSION RETRIEVAL OF INSTRUMENTED MARINE CABLES

(75) Inventor: Andre' W. Olivier, River Ridge, LA (US)

(73) Assignee: ION Geophysical Corporation, Houston, TX (US)

( * ) Notice: Subject to any disclaimer, the term of this patent is extended or adjusted under 35 U.S.C. 154(b) by 26 days.

(21) Appl. No.: 13/351,920

(22) Filed: Jan. 17, 2012

(65) Prior Publication Data
US 2013/0183100 A1 Jul. 18, 2013

(51) Int. Cl.
F16L 1/00 (2006.01)
G01V 1/38 (2006.01)

(52) U.S. Cl.
CPC ................... G01V 1/3843 (2013.01)

(58) Field of Classification Search
CPC ...... B63B 35/04; B65G 17/12; B65G 17/126; B65G 17/14; B65G 2814/0397; B65G 35/08; B65G 47/844
USPC ........ 405/158, 166, 167, 168.1, 168.3, 168.4, 405/173; 198/701, 729, 469.1, 803.3
See application file for complete search history.

(56) References Cited

U.S. PATENT DOCUMENTS

| 290,389 | A | * | 12/1883 | Brigham | 221/219 |
| 1,703,777 | A | * | 2/1929 | Pernot | 242/419.4 |
| 2,355,213 | A | * | 8/1944 | Flanagan | 414/140.8 |
| 3,310,213 | A | * | 3/1967 | Gretter | 226/172 |
| 3,438,213 | A | * | 4/1969 | Broussard | 405/167 |
| 3,472,035 | A | * | 10/1969 | Broussard | 405/167 |
| 3,583,582 | A | * | 6/1971 | Ostarello | 414/139.6 |
| 3,822,779 | A | * | 7/1974 | McAuley | 198/730 |
| 4,396,109 | A | * | 8/1983 | Nambu | 198/431 |
| 4,828,223 | A | * | 5/1989 | Russell et al. | 254/265 |
| 5,197,716 | A | * | 3/1993 | Zibilich et al. | 254/134.3 SC |
| 5,580,187 | A | * | 12/1996 | Jordan | 405/166 |
| 5,626,095 | A | * | 5/1997 | Runion | 119/57.2 |
| 5,875,883 | A | * | 3/1999 | Ertel et al. | 198/821 |
| 5,902,072 | A | * | 5/1999 | Berges | 405/173 |
| 6,439,445 | B1 | * | 8/2002 | De Groot et al. | 226/172 |
| 6,607,068 | B1 | * | 8/2003 | Walther et al. | 198/456 |
| 6,834,581 | B2 | * | 12/2004 | Ackley | 101/35 |
| 7,036,655 | B2 | * | 5/2006 | Schafer | 198/459.2 |
| 7,104,214 | B2 | * | 9/2006 | Niebur | 114/230.2 |

(Continued)

FOREIGN PATENT DOCUMENTS

EP 0409361 A2 1/1991
EP 1876472 A2 1/2008

OTHER PUBLICATIONS

International Search Report and Written Opinion of the International Searching Authority, PCT/US13/21810, mailed Apr. 24, 2013, European Patent Office, Rijswijk, NL.

Primary Examiner — Doug Hutton, Jr.
Assistant Examiner — Patrick Lambe
(74) Attorney, Agent, or Firm — James T. Cronvich

(57) ABSTRACT

Apparatus and method for retrieving instrumented marine cables. The cable-handling apparatus comprises carriers that capture and pull on rigid elements in or on a marine cable to retrieve the cable hand-over-hand onto a deployment vessel. The carriers are spaced apart along an endless path on spacings matching the spacings of the rigid elements in the cable. A take-up mechanism allows manual adjustment of the relative spacings of the carriers to account for tolerances in the spacings of the rigid elements on the cable.

15 Claims, 3 Drawing Sheets

(56) References Cited

U.S. PATENT DOCUMENTS

| | | |
|---|---|---|
| 7,284,745 B2 | 10/2007 | Keane et al. |
| 7,520,490 B1 * | 4/2009 | Lee .............................. 254/372 |
| 7,584,837 B2 * | 9/2009 | Roether et al. ................ 198/717 |
| 2004/0094389 A1 * | 5/2004 | Boyce ...................... 198/377.01 |
| 2005/0087731 A1 | 4/2005 | Scott |
| 2008/0006802 A1 * | 1/2008 | Pesnel ........................... 254/226 |
| 2010/0323599 A1 * | 12/2010 | Hiddink et al. ............... 452/179 |
| 2012/0183357 A1 * | 7/2012 | Randrianarivony et al. .. 405/166 |

\* cited by examiner

US 9,081,120 B2

APPARATUS AND METHOD FOR LOW-TENSION RETRIEVAL OF INSTRUMENTED MARINE CABLES

BACKGROUND

The invention relates generally to marine seismic prospecting and more particularly to shipboard cable-handling systems for retrieving instrumented marine cables.

Marine cables instrumented with hydrophones and other sensors are used in prospecting for oil and gas under the sea floor. Streamers are instrumented cables towed behind a survey vessel to detect reflections of periodic seismic blasts off geologic structures under the sea floor. Ocean bottom cables (OBCs) are instrumented cables laid on the sea floor by a deployment vessel to detect reflections of seismic blasts. After deployment, streamers and OBCs have to be retrieved by the vessel and stored.

Conventional cable-handling systems apply tension to the cables by frictionally pulling them aboard the vessel. In the case of streamers, the cable-handling systems frictionally engage the outer skins, or jackets, of the streamers, causing internal shear forces that can damage the sensors, wires, and other streamer components. In the case of OBCs, the cable-handling systems frictionally engage the outer armor layer or an outer jacket, damaging and wearing these outer components and shortening the lifetimes of the cables. Streamers and OBCs both have rigid sections that, while under the tension caused by cable-handling systems, have to pass over curved guides or surfaces on the vessel during retrieval. The cable-handling systems thus create high bending loads in the rigid sections as they pass over curved surfaces under tension. If great enough, the bending loads can damage the rigid sections.

Thus, there is a need to prevent damage to instrumented marine cables during retrieval by a deployment vessel.

SUMMARY

This need and other needs are addressed by a cable-handling system embodying features of the invention. The instrumented-marine-cable-handling system comprises carriers disposed at spaced apart positions around an endless path. A drive system advances the carriers around the endless path. An instrumented marine cable that has spaced rigid elements attached along its length travels over a nonlinear retrieval path segment during retrieval. The carriers engage and pull the rigid elements of the cable to draw the cable along the nonlinear retrieval path segment.

In another aspect of the invention, a method for retrieving instrumented marine cables comprises: (a) driving carriers disposed at spaced apart positions around an endless path; (b) engaging spaced apart rigid elements of an instrumented marine cable with the spaced apart carriers; and (c) drawing the instrumented marine cable over a nonlinear retrieval path segment in low tension with pulling forces exerted by the carriers against the rigid elements.

BRIEF DESCRIPTION OF THE DRAWINGS

These features and aspects of the invention, as well as its advantages, are described in detail in the following description, appended claims, and accompanying drawings, in which:

DETAILED DESCRIPTION

Figure 1:
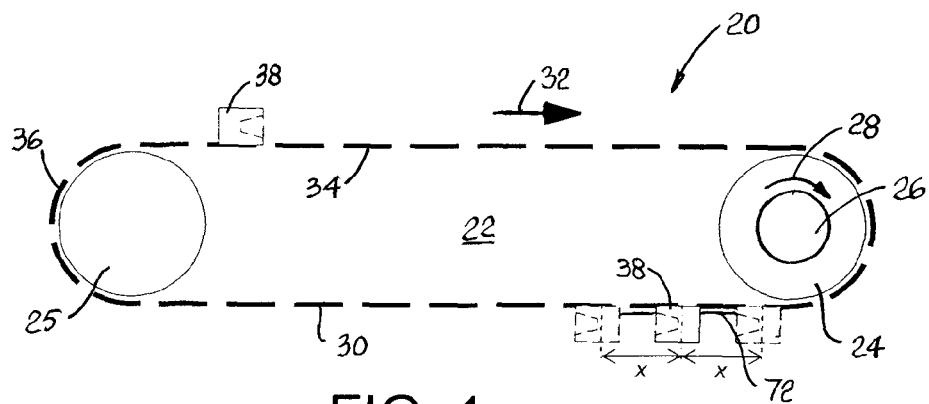
FIG. 1 is a side elevation view of one version of a cable-handling system embodying features of the invention, including a linear drive.

One version of a shipboard cable-handling system for retrieving streamers, OBCs, or other instrumented marine cables is shown in FIG. 1. The linear cable-handling system 20 includes a drive system 22 consisting of a drive wheel or sprocket set 24 and an idle wheel or sprocket set 25. A motor 26 rotates the drive wheel 24 in a clockwise direction 28. A loop member 30, such as chain, belt, or cable, is trained around the drive and idle wheels 24, 25 and driven by the drive wheel 24 in a direction of travel 32 along an endless path that includes a linear path segment 34 along a top run of the loop member and a nonlinear path segment 36 around the idle wheel 25. ("Nonlinear" means "not linear" in the strict Euclidean sense and includes "arcuate," "curved," "circular," and "piecewise linear" within its definition.) A plurality of carriers 38 are mounted to the loop member 30 at spaced apart positions along the length of the loop. The positions could be regularly spaced or not. The carriers 38 are used to pull instrumented marine cables, such as an OBC 40 (FIG. 3), over the nonlinear retrieval path segment 36.

Figure 3:
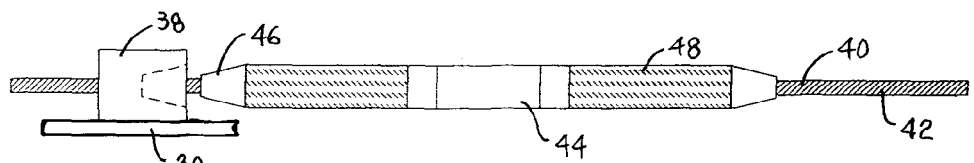
FIG. 3 is a side view of a portion of an ocean bottom cable in a cable-handling system as in FIG. 1 or 2.

The portion of the OBC 40 shown in FIG. 3 consists of a strength cable 42 and a rigid element 44, in this example, a sensor node section. The rigid element is not as amenable to bending as the strength cable. The carrier 38 engages and drives the aft end 46 of the rigid element 44 to relieve tension, which could otherwise cause outer skins, or jackets 48, surrounding portions of the OBC from sliding relative to the surrounded sensor components. Preferably, the carrier 38 first engages the rigid element 44 on its entry into the nonlinear retrieval path segment 36 around the idle wheel 25 to de-tension the rigid element as it passes around the idle wheel. The de-tensioning prevents damage to the rigid element that could be caused by excessive bending under tension as the rigid element is drawn over the nonlinear retrieval path segment.

Figure 4:
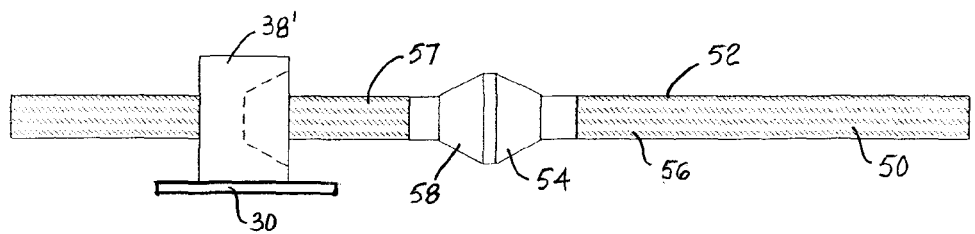
FIG. 4 is a side view of a portion of a streamer cable in a cable-handling system as in FIG. 1 or 2.

FIG. 4 shows a slightly modified carrier 38' that is usable with an instrumented towed streamer 50. The streamer consists of an outer jacket 52 surrounding sensor components, strength members or cables, communication coils, and wiring harnesses. A rigid element, in the form of an in-line attachment block 54, connects forward and aft sections 56, 57 of the streamer together. The enlarged carrier 38', which mounts to the loop member 30 (FIG. 1), engages and drives against the aft end 58 of the rigid element 54 in a similar way as the carrier 38 engages and drives against the aft end 46 of the rigid element 44 of the OBC 40.

Figure 2:
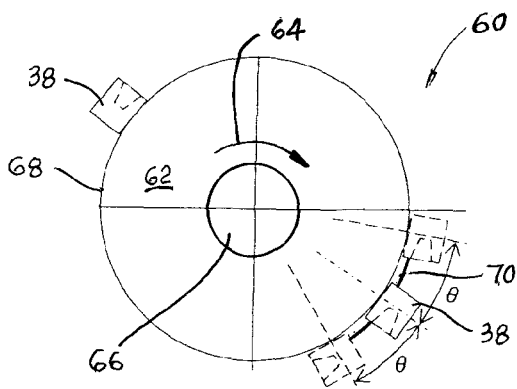
FIG. 2 is a side elevation view of another version of a cable-handling system embodying features of the invention, including a rotational drive.

A rotating drum- or wheel-drive cable-handling system 60 embodying features of the invention is shown in FIG. 2. A large-diameter drive wheel 62 is rotated in a clockwise direction 64 by a drive member 66. Carriers 38 are mounted on or at the periphery of the wheel 62 at spaced apart positions, such as on generally regular spacings or on predetermined spacings that generally match the spacings between the rigid elements on the OBC. In this example, two carriers are positioned 180° apart. The carriers engage the aft ends 46 of the rigid elements 44 of an OBC, for example, to guide it under low tension around a nonlinear retrieval path segment 68 of the endless peripheral path of the carrier. A rotational take-up mechanism 70 associated with each of the carriers 38 allows the angular position θ of the carrier to be manually adjusted to account for tolerances in the spacings of the rigid elements in the marine cable. Similarly, a linear take-up mechanism 72 in the linear drive of FIG. 1 allows the linear position x of the carrier 38 to be manually adjusted to account for tolerances in the spacings of the rigid elements in the cable.

Figure 5:
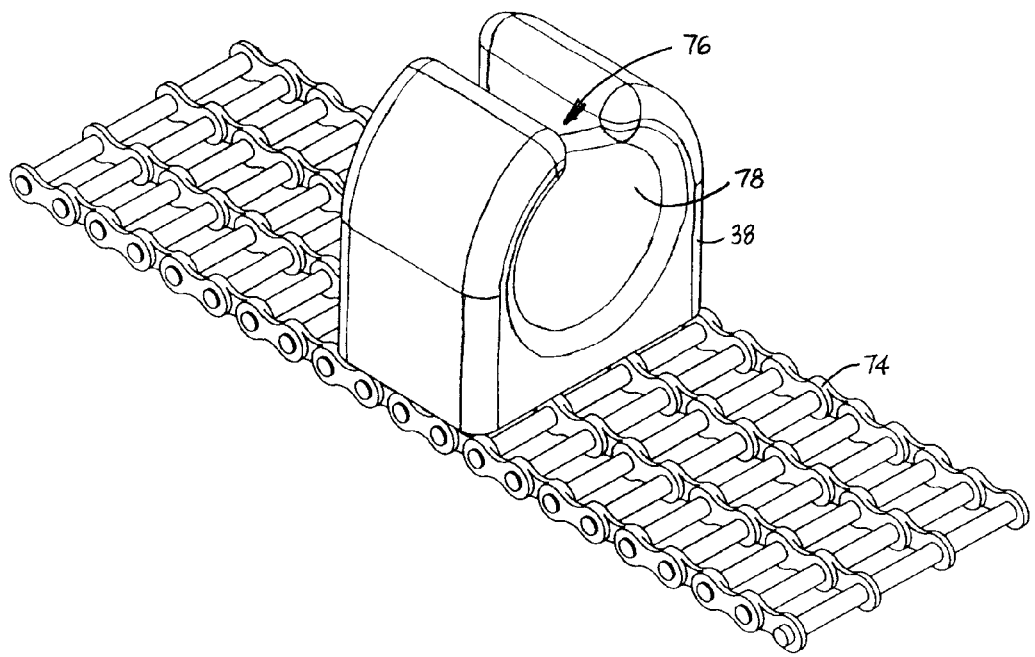
FIG. 5 is an isometric view of a carrier as in FIG. 1 or 2 mounted on a chain.

A more detailed view of one of the carriers 38 attached to a roller chain 74 is shown in FIG. 5. The carrier has a slot 76 opening onto a concave conical contact face 78 shaped to mate with and drive against the aft ends of the rigid elements of an instrumented marine cable. The slot 76 is spaced to admit the cable so that the contact face 78 engages the cable's rigid element. The endless chain, with one or more spaced apart carriers, is trained around drive and idle sprocket wheels 24, 25 as in FIG. 1.

Figure 6:
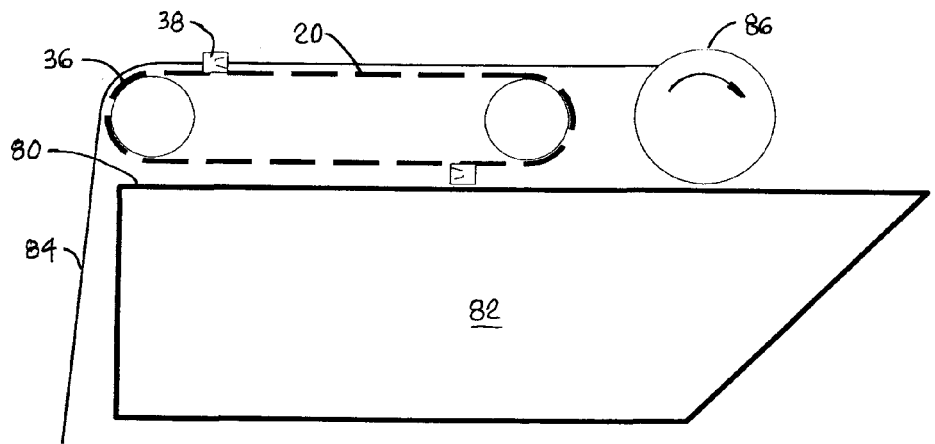
FIG. 6 is a side elevation view of a deployment vessel with a cable-handling system as in FIG. 1 on the back deck.

FIG. 6 shows a linear cable-handling system 20, as in FIG. 1, mounted on the back deck 80 of a deployment vessel 82. The cable-handling system 20 retrieves the cable 84 over the nonlinear retrieval path segment 36 of the endless carrier path at the idle-wheel end. The carriers 38 relieve the cable tension. A winch drum 86 winds the cable 84 onto its periphery for storage.

Figure 7:
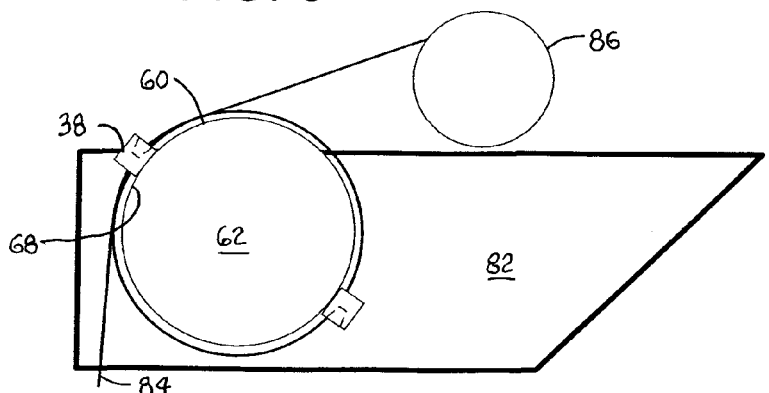
FIG. 7 is a side elevation view of a deployment vessel with a cable-handling system as in FIG. 2 mounted off the starboard side of the vessel.
Figure 8:
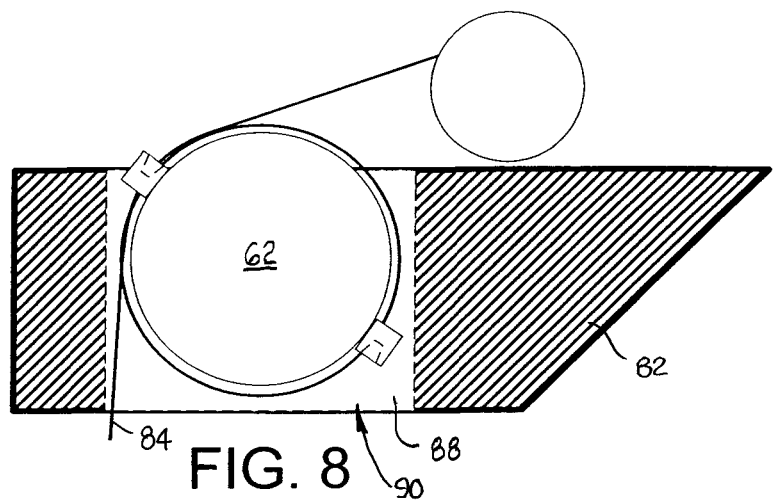
FIG. 8 is a cross section of a deployment vessel with a cable-handling system as in FIG. 2 mounted in a moon pool.

FIG. 7 shows another cable-handling arrangement. In this example, a wheel-drive cable-handling system 60 as in FIG. 2 is shown deployed off the starboard side of the survey vessel 82. The spaced apart carriers 38 pull the cable 84 over the curved retrieval path segment 68 of the carriers' endless path around the wheel 62 without tension as it rotates. A winch drum 86 winds the cable onto its periphery. FIG. 8 shows a similar arrangement to that in FIG. 7, except that the wheel 62 is mounted in a moon pool 88 in the interior of the deployment vessel 82. In this example, the marine cable 84 is retrieved through a lower opening 90 in the hull of the vessel.

Figure 9:
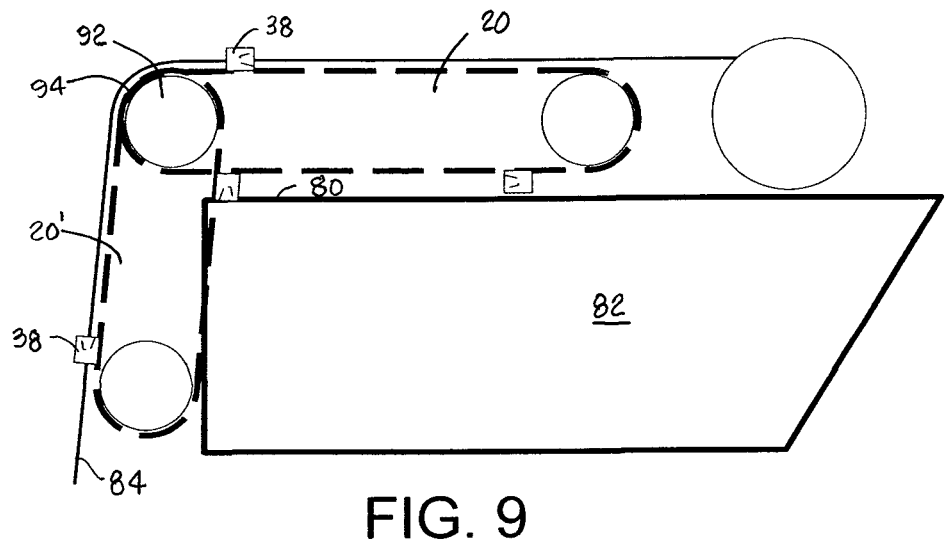
FIG. 9 is a side elevation view of a deployment vessel having a pair of cable-handling systems as in FIG. 1 arranged in series.
Figure 10:
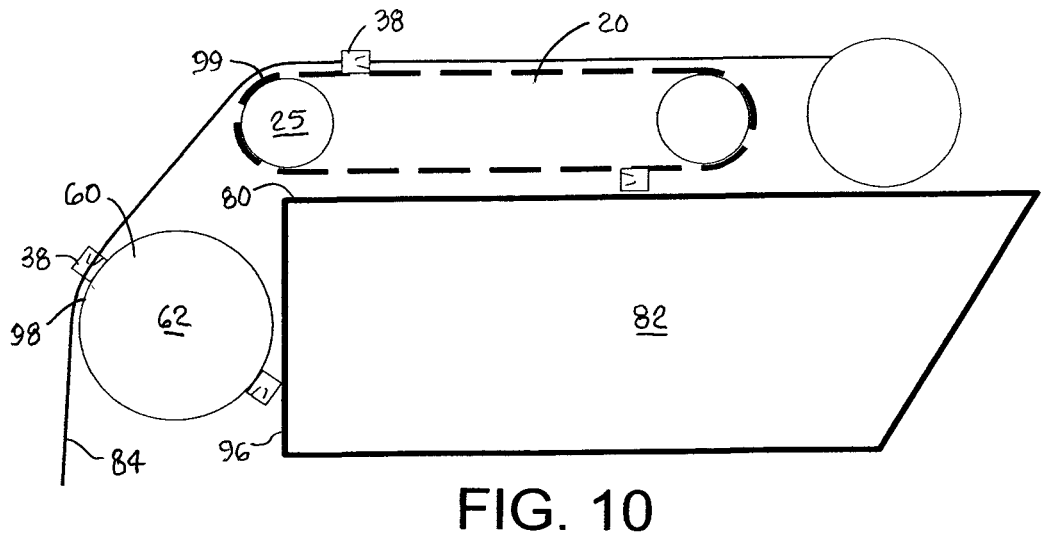
FIG. 10 is a side elevation view of a deployment vessel having a cable-handling system as in FIG. 1 in series with a cable-handling system as in FIG. 2.

Other exemplary cable-handling arrangements are shown in FIGS. 9 and 10. FIG. 9 shows two linear cable-handling systems 20, 20' arranged in series and sharing a common wheel 92. A portion of the wheel 92 defines a nonlinear retrieval path segment 94 that the cable passes over. The driving engagement of the carriers 38 with rigid elements on the cable reduces the tension in the cable as it rounds the shared wheel 92 off the rear of the back deck 80 of the vessel 82. The arrangement in FIG. 10 includes a wheel-drive cable-handling system 60 suspended off the stern 96 of the deployment vessel 82 in series with a back-deck-mounted linear cable-handling system 20. The carriers 38 lift and draw the cable 84 around nonlinear retrieval path segments 98, 99 on a portion of the periphery of the wheel 62 of the wheel-drive system 60 and on a portion of the periphery of the idle wheel 25 of the linear system 20.

Thus, the cable-handling system described with reference to a few versions decreases tension in a marine cable during retrieval by using spaced apart carriers to capture spaced apart rigid elements on or in the cable and pull the rigid elements hand-over-hand over nonlinearities in the retrieval path. One or more such cable-handling systems can be arranged in various geometries to realize a desired cable-retrieval path.

What is claimed is:

1. An instrumented-marine-cable-handling system comprising:
    a first plurality of monolithic carriers disposed at spaced apart positions around an endless path, each of the monolithic carriers having a contact face;
    a first drive system advancing the plurality of carriers around the endless path;
    a nonlinear retrieval path segment along which an instrumented marine cable having spaced apart rigid elements attached along the length of the marine cable travels when being retrieved, wherein the rigid elements have aft ends and wherein the contact faces are shaped to mate with the shape of the aft ends;
    wherein the monolithic carriers have fixed-width slots extending radially into the monolithic carriers and through the contact faces to admit the instrumented marine cable radially into the monolithic carriers;
    wherein the contact faces of the advancing carriers engage and drive against the aft ends to pull the rigid elements of the instrumented marine cable to draw the instrumented marine cable along the nonlinear retrieval path segment.

2. An instrumented-marine-cable-handling system as in claim 1 wherein the first drive system comprises a rotating wheel having a periphery defining the endless path as circular and wherein the nonlinear retrieval path segment is a portion of the circular endless path.

3. An instrumented-marine-cable-handling system as in claim 1 wherein the endless path includes the nonlinear retrieval path segment and further includes a linear retrieval path segment adjacent to the nonlinear retrieval path segment.

4. An instrumented-marine-cable-handling system as in claim 1 wherein the first drive system comprises a pair of wheels and a loop member trained around the wheels to define the endless path with the nonlinear retrieval path segment around one of the wheels and a linear retrieval path segment between the two wheels, wherein the carriers are attached to the loop member and one of the wheels is a drive wheel driving the loop member and the carriers along the endless path.

5. An instrumented-marine-cable-handling system as in claim 1 further comprising a second plurality of carriers and a second drive system advancing the second plurality of carriers around a second endless path, wherein the second drive system is in series with the first drive system.

6. An instrumented-marine-cable-handling system as in claim 1 further comprising a take-up mechanism disposed at the position of one or more of the carriers for adjusting the positions of each of the one or more carriers to account for tolerances in the spacings of the spaced apart rigid elements along the length of the instrumented marine cable.

7. An instrumented-marine-cable-handling system as in claim 1 wherein the carriers are disposed at regularly spaced apart positions around the endless path.

8. A method for retrieving instrumented marine cables, comprising:
    driving a plurality of monolithic carriers having contact faces at spaced apart positions around an endless path;
    admitting an instrumented marine cable radially into the monolithic carriers through slots opening radially into the monolithic carriers and extending through the contact faces;

engaging aft ends of spaced apart rigid elements of the instrumented marine cable with the contact faces of the spaced apart monolithic carriers without clamping against the rigid elements, wherein the contact faces are shaped to mate with the shape of the aft ends;

drawing the instrumented marine cable over a nonlinear retrieval path segment with pulling forces exerted by the carriers against the aft ends of the rigid elements.

9. The method of claim 8 further comprising mounting a drive system driving the plurality of carriers around the endless path in a moon pool of a marine-cable deployment vessel.

10. The method of claim 8 further comprising mounting a drive system driving the plurality of carriers around the endless path on the back deck of a marine-cable deployment vessel.

11. The method of claim 8 further comprising mounting a drive system driving the plurality of carriers around the endless path on the side of a marine-cable deployment vessel.

12. The method of claim 8 further comprising disengaging the carriers from the rigid elements and collecting the instrumented marine cable on a winch drum.

13. The method of claim 8 further comprising adjusting the position of at least one of the carriers to account for tolerances in the spacing of the rigid elements of the instrumented marine cable.

14. The method of claim 8 further comprising engaging the rigid elements of the instrumented marine cable with another set of spaced apart carriers driven along an aft endless path.

15. An instrumented-marine-cable-handling system comprising:

a plurality of carriers disposed at spaced apart positions around an endless path;

a drive system advancing the plurality of carriers around the endless path;

a nonlinear retrieval path segment of the endless path along which an instrumented marine cable having spaced apart rigid elements along the length of the marine cable travels when being retrieved, wherein the rigid elements have aft ends and a diameter larger than the diameter of the instrumented marine cable;

wherein the advancing carriers engage and drive against the aft ends to pull the rigid elements of the instrumented marine cable to draw the instrumented marine cable along the nonlinear retrieval path segment;

wherein each of the plurality of carriers has a concave contact face that is shaped to mate with the shape of the aft ends of the rigid elements and a slot that extends the length of the carrier and through the contact face, wherein the slot is sized to admit the instrumented marine cable but not the larger-diameter rigid elements radially into the carrier.

\* \* \* \* \*